(12) United States Patent
Bleiner

(10) Patent No.: US 7,404,653 B2
(45) Date of Patent: Jul. 29, 2008

(54) EMERGENCY OPTICAL SIGNALLING DEVICE

(75) Inventor: Thomas Bleiner, Lugano (CH)

(73) Assignee: Meridiana Investmenti SAGL, Lugano (CH)

( * ) Notice: Subject to any disclaimer, the term of this patent is extended or adjusted under 35 U.S.C. 154(b) by 28 days.

(21) Appl. No.: 10/519,786

(22) PCT Filed: Jul. 1, 2003

(86) PCT No.: PCT/IB03/02571

§ 371 (c)(1),
(2), (4) Date: Jan. 23, 2006

(87) PCT Pub. No.: WO01/45980

PCT Pub. Date: Jun. 28, 2001

(65) Prior Publication Data

US 2006/0215116 A1    Sep. 28, 2006

(30) Foreign Application Priority Data

Jul. 1, 2002  (IT) .......................... VI2002A0143

(51) Int. Cl.
*B60Q 1/00* (2006.01)
*B60Q 1/26* (2006.01)

(52) U.S. Cl. .................... 362/493; 362/499; 362/542; 362/540

(58) Field of Classification Search ............... 362/459, 362/479, 493, 490, 499, 542, 543, 800, 269, 362/271, 544, 548, 549, 540
See application file for complete search history.

(56) References Cited

U.S. PATENT DOCUMENTS

| 2,814,029 | A | * | 11/1957 | Mcrea | 340/472 |
| 3,784,809 | A | * | 1/1974 | Smith | 362/35 |
| 5,097,397 | A | * | 3/1992 | Stanuch et al. | 362/493 |
| 5,517,388 | A | * | 5/1996 | Hutchisson | 362/35 |
| 6,142,649 | A | * | 11/2000 | Beghelli | 362/259 |
| 6,183,100 | B1 | | 2/2001 | Stuckow et al. | |
| 6,547,410 | B1 | * | 4/2003 | Pederson | 362/35 |
| 6,772,525 | B2 | * | 8/2004 | Newcomer | 33/286 |
| 2004/0041983 | A1 | * | 3/2004 | Bleiner | 353/13 |

FOREIGN PATENT DOCUMENTS

| GB | 2 360 350 | 9/2001 |
| WO | 01/45980 | 6/2001 |

* cited by examiner

*Primary Examiner*—Jacob Y Choi
(74) *Attorney, Agent, or Firm*—Dykema Gossett PLLC

(57) ABSTRACT

Optical signalling device (1, 20, 30) for vehicles (A), comprising: a support element (2) fitted to the abovementioned vehicle (A), a revolving element (3) arranged on the support element (2) and coupled to drive means (4) able to cause rotation thereof and one or more optical signalling elements (8) associated with the revolving element (3) and electrically connected to an electric power source able to illuminate them. Each optical signalling element (8) comprises one or more laser light generators/emitters (9).

5 Claims, 5 Drawing Sheets

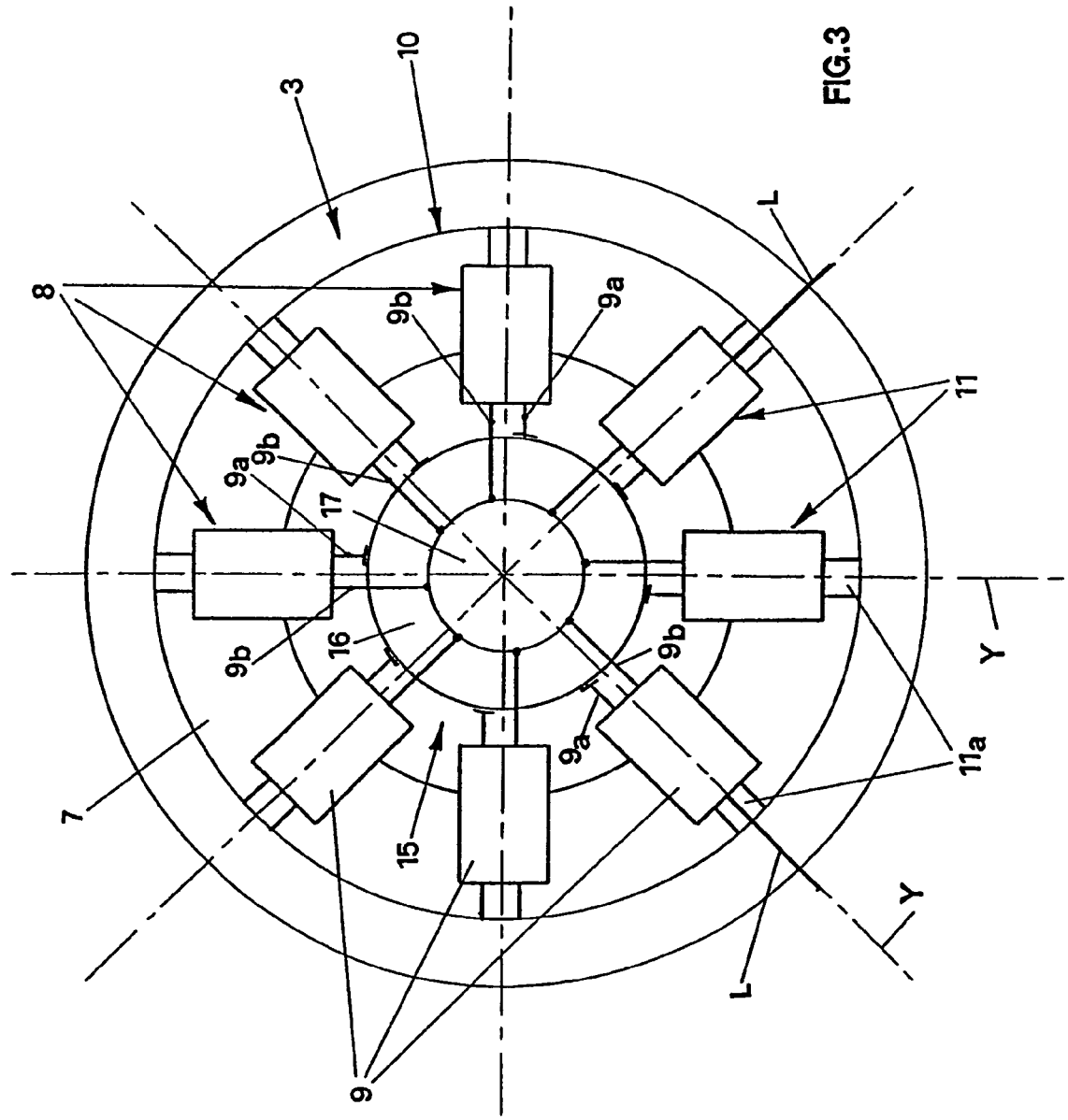

EMERGENCY OPTICAL SIGNALLING DEVICE

TECHNICAL FIELD

The invention relates to an emergency optical signalling device.

The signalling device is particularly suitable for installation on public utility vehicles and transport means, for example transport means used by the police, fire brigade and rescue services, especially in combination with acoustic signalling devices.

BACKGROUND ART

It is known that public utility transport means, such as the vehicles used by the police and rescue services in general, are equipped with optical and acoustic signalling devices which are activated in the event of an emergency in order to signal the presence of the vehicles and request priority in heavy traffic conditions.

With the same aims, the same signalling devices may also be used on watercraft and airborne vehicles.

The combination of the acoustic signalling devices with the optical signalling devices is necessary because the former, generally a siren, by means of their sound indicate that there is an emergency, while the optical signalling devices allow precise determination of the direction from which the rescue vehicle is coming so that the traffic occupying the roadway may move aside and allow the vehicle to pass through.

The advantages of the signalling system are therefore based on the efficiency of both the signalling devices and in particular their use in combination with each other.

The optical and acoustic signalling devices of the known type present on the market and widely used have, however, certain drawbacks.

A first limitation consists in the fact that, while the acoustic signalling devices use a siren, the sound of which can be heard from far away in any environmental conditions, the visibility of the light beam emitted by the optical signalling devices is instead reduced, for example in the case of rain or fog.

In fact, the optical signalling devices of the known type use incandescent or halogen lamps which generate a light ray which is projected over a certain distance by a rotating directional dish, but which, because of the incoherent nature of the radiation forming it, is greatly absorbed by the water droplets which form the rain or the fog.

The result is that, in the event of particularly dense fog, the light ray is visible no more than a few metres from the lamp which emits it.

DE-A-4012120, which is considered the closest prior art to the invention, discloses an optical signaling device according to the preamble of claim 1.

Further optical signaling devices are known from US-B6183100, WOA-01/45980 and GB-A-2 360 350.

However, none of the optical signaling devices disclosed in such prior art documents permits to envelope the vehicle on which is mounted making it clearly visible at a great distance.

DISCLOSURE OF THE INVENTION

The present invention aims to overcome the abovementioned drawbacks by providing an optical signalling device, the function of which is to generate a light ray which is not attenuated by rain or fog.

Another object is that the optical signalling device according to the invention should emit a light ray which is more clearly visible in the fog compared to signalling devices of the known type.

Last but not least, the optical signalling device according to the invention may be designed with dimensions which are comparable to those of known devices.

These and other objects are achieved by means of an optical signalling device for a vehicle or movable transport means, which in accordance with the main claim comprises at least one support element which can be secured to said vehicle or means, at least one revolving element constrained to said support element and coupled to drive means acting on said revolving element so as to cause it to rotate, at least one optical signalling element associated with said revolving element and electrically connected to an electric power source able to illuminate it, characterized in that said at least one optical signalling element comprises at least one laser light generator/emitter.

Thanks to this arrangement, the optical signalling device according to the invention is effective in particular in the case of fog since the rays of coherent light emitted by the laser, unlike the rays of incoherent light emitted by halogen or incandescent lamps of the known type, are more clearly visible in the fog.

Advantageously, a plurality of laser generators/emitters are fixed peripherally to the revolving element and directed towards the support surface on the vehicle.

In this way, during rotation, the rays define in foggy conditions a visible luminous cone which envelopes the vehicle like a hood and which moves together with the vehicle, making it clearly distinguishable at a great distance.

BRIEF DESCRIPTION OF THE DRAWINGS

Further features and advantages of the invention will be more clearly understood from the detailed description of a preferred but not exclusive embodiment of the invention, illustrated by way of a non-limiting example with the aid of the accompanying drawings in which:

FIG. 3 shows a cross-section through the signalling device according to the invention;

DETAILED DESCRIPTION OF A PREFERRED EMBODIMENT

During the course of the description the terms "laser light emitter" and "laser light generator" will be regarded as equivalent in the sense that the emitter and the generator may form a single element or separate elements.

Moreover, the signalling device according to the invention may be applied to any self-propelled or motorised vehicle or means.

Figure 1:
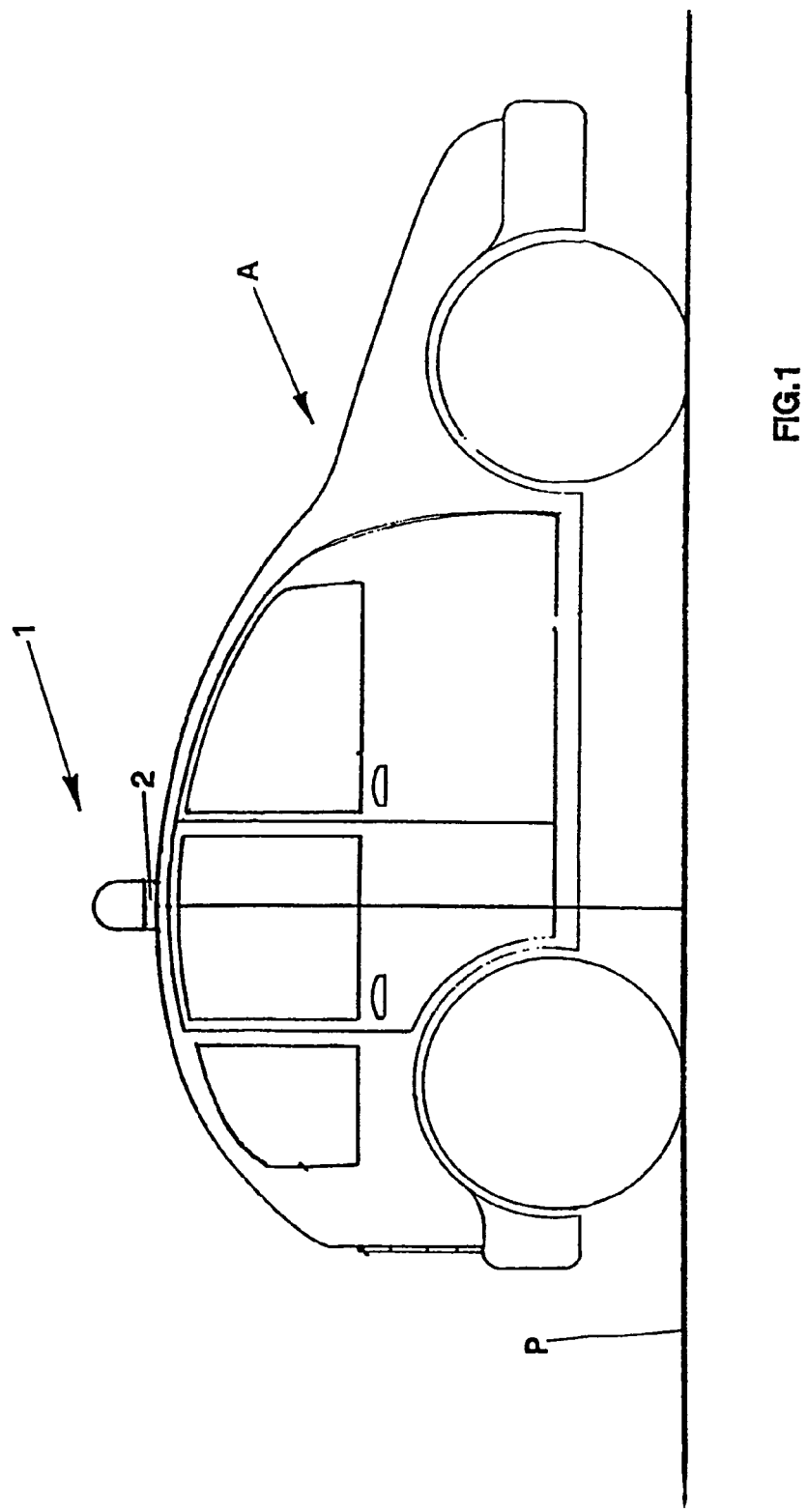
FIG. 1 shows an axonometric view of a vehicle to which the optical signalling device according to the invention has been applied.

The signalling device according to the invention is illustrated in FIG. 1 where it has been denoted overall by 1 and is fitted to the roof of a motor vehicle denoted overall by A.

It is nevertheless understood that the signalling device may be applied to any vehicle or means and will be particularly useful for public utility vehicles such as the transport means used by the police, rescue and emergency services, fire brigade and the like.

Figure 2:
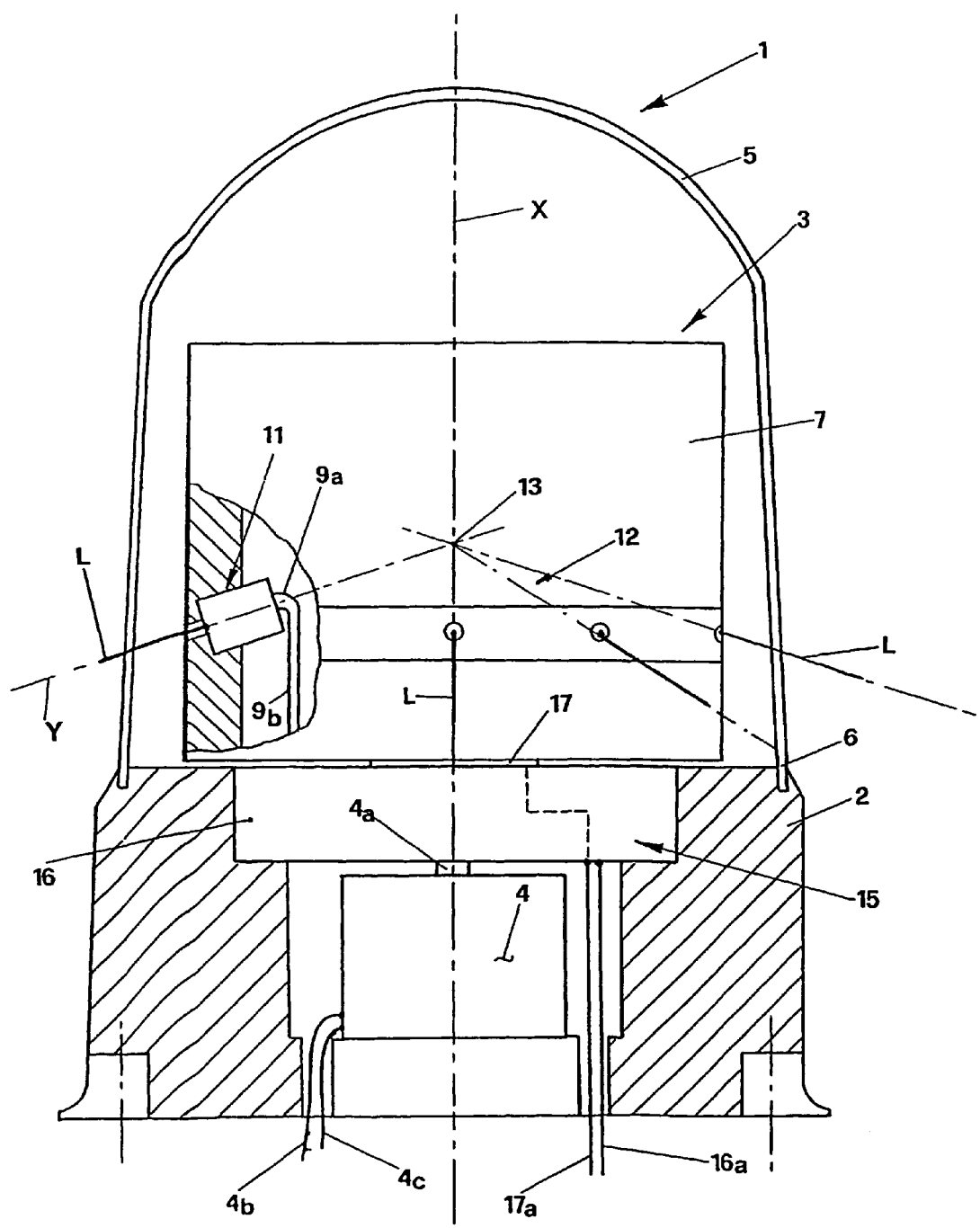
FIG. 2 shows a longitudinal section through the signalling device according to the invention.

With reference to FIGS. 2 and 3, the signalling device 1 comprises a support element 2 which may be fitted by means of fixing means of a type known per se to the roof of the motor vehicle A. The element 2 is able to receive a revolving element 3 coupled to drive means comprising, for example, an electric motor 4 and, if necessary, reducer (not shown in the drawings).

The revolving element 3 is covered by a transparent cap 5, the bottom edge of which is engaged with the support element 2, and comprises an internally hollow cylindrical body 7 which defines an axis of rotation X arranged vertically.

One or more optical signalling elements, overall denoted by 8, are housed inside the cylindrical body 7 and, according to the invention, consist of one or more laser light generators/emitters 9.

It is particularly pointed out that the side wall 10 of the cylindrical body 7 is provided with one or more seats 11 each of which houses a respective generator/emitter 9 which emits a laser light ray L through an emission hole 11a coaxial with the respective seat 11.

Each seat 11 and the respective emission hole 11a define a longitudinal axis Y which is inclined with respect to the longitudinal axis of rotation X of the cylindrical body 7 and is directed towards the plane of travel P of the vehicle A.

More precisely, the longitudinal axes Y of the emission holes 11a are arranged so as to form a conical surface 12 having its vertex 13 along the longitudinal axis of rotation X and its base directed towards the plane of travel P of said vehicle A.

In order to emit light, each of the generators/emitters 9 must be supplied with electric current and for this purpose a rotating distributor 15 is provided between the electric motor 4 and the cylindrical body 7.

The rotating distributor 15, which is of the type known per se, has the stator part 16 fixed to the support element 2 and the rotor part 17 fixed to the cylindrical body 7 and to the shaft 4a of the electric motor 4.

In turn each generator/emitter 9 has two electric power supply cables 9a and 9b which are connected respectively to the stator 16 and to the rotor 17 of the rotating distributor 15.

In turn, the stator 16 and the rotor 17 are connected by means of cables 16a and 17a to an electric power source.

The electric motor 4 is also connected by means of cables 4b and 4c to the same electric power source which, preferably but not necessarily, consists of the battery of the motor vehicle A.

Figure 4:
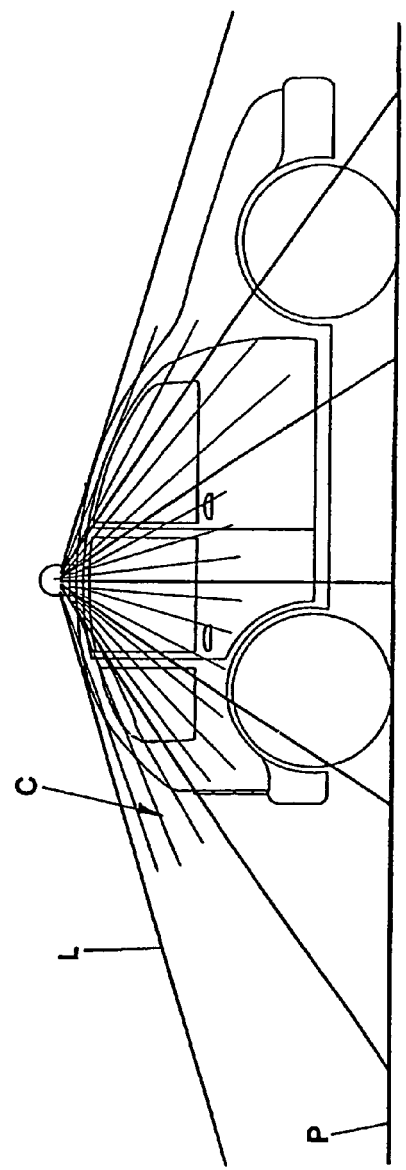
FIG. 4 shows an axonometric view of the signalling device according to the invention applied to a motor vehicle, during operation.

In use, when the optical signalling device is in operation and the motor car A is travelling in fog, as shown in FIG. 4, the laser rays L are emitted from the emission holes 11a and become visible as a result of refraction of the laser ray against the water particles which form the fog.

If rotation of the cylindrical body 7 is sufficiently fast, the image which is formed is that of a cone of light C which envelopes the body of the car A like a hood—visible in FIG. 4—and which moves at the same speed.

The motor vehicle thus becomes clearly visible since it is enveloped by a long-range coherent light.

This makes the car visible in fog and its visibility even increases with an increase in the density of the fog since the refraction of the laser ray increases.

Preferably, the signalling device according to the invention will be installed in combination with the conventional incoherent-light signalling devices with rotating dishes which perform in an optimum manner signalling under normal environmental conditions, i.e. where there is no rain or fog.

Figure 5:
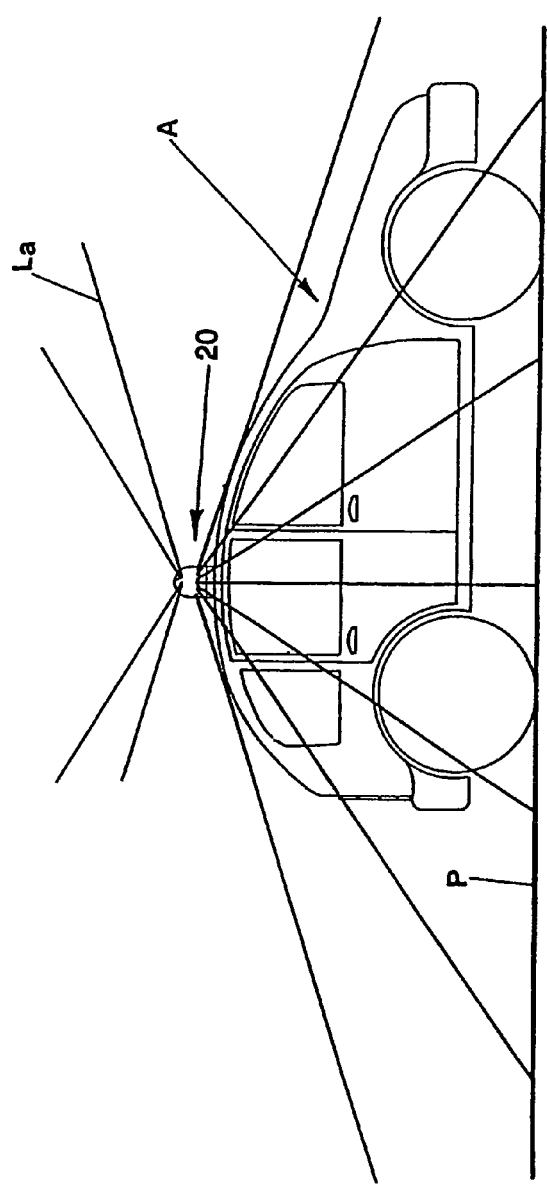
FIG. 5 shows a variation of embodiment of the signalling device according to the invention applied to a motor vehicle, during operation.

Another embodiment of the signalling device is shown in FIG. 5 where it is denoted overall by 20 and differs from the embodiment described above owing to the presence also of generators/emitters which generate laser light rays diverging upwards.

This embodiment is particularly useful during search of vehicles and watercraft from the air.

Figure 6:
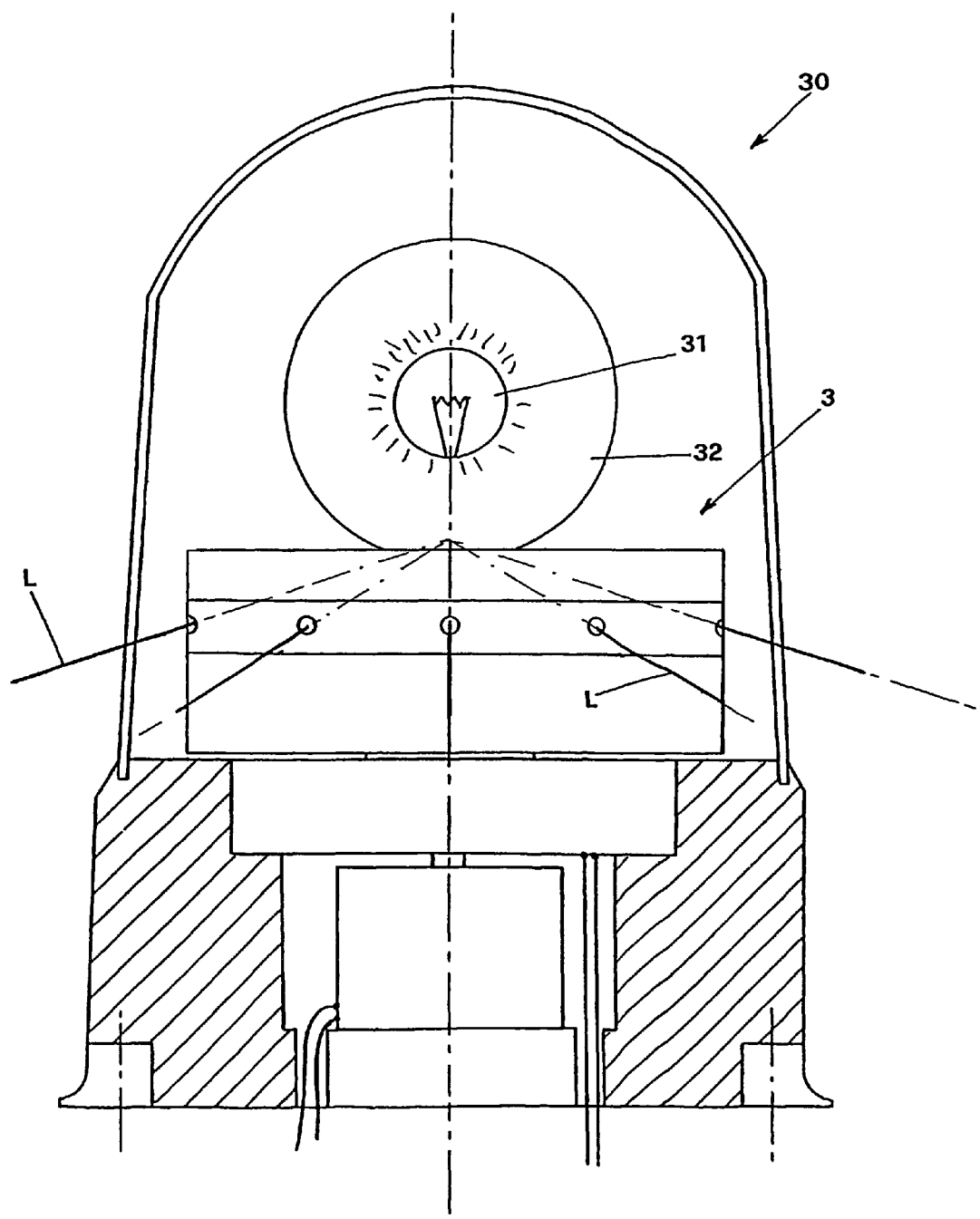
FIG. 6 shows a further variation of embodiment of the invention.

A further embodiment of the invention, denoted in its entirety by 30, is shown in FIG. 6 and differs from the other embodiments owing to presence also, in addition to the laser light emitters L, of light emitters of the conventional type 31, for example incandescent or halogen lamps complete with rotating dish 32, which are housed in the revolving element 3.

From the above it can be understood that the optical signalling device according to the invention, in all the variations of embodiments illustrated and described, achieves the intended objects.

The signalling device according to the invention may be subject to numerous modifications and changes all falling within the scope of the accompanying claims.

All the details may be replaced by other technically equivalent elements and the materials may differ according to the requirements without departing from the scope of the invention.

The present application is based on and claims the priority of patent application No. VI2002A000143 filed in Italy on Jan. 7, 2002, the disclosure of which is expressly incorporated herein by way of reference.

The invention claimed is:

1. Optical signaling device for a vehicle, comprising:
   at least one support element fitted onto the vehicle;
   a revolving element arranged on said support element for rotation about a substantially vertical rotation axis;
   drive means acting on said revolving element to promote rotation thereof about said rotation axis;
   one or more optical signaling elements associated with said revolving element and electrically connected to an electric power source for illumination, each of said optical signaling elements comprising coherent laser light generators/emitters;
   wherein said revolving element comprises a cylindrical body coaxial with said rotation axis and housing internally thereof said one or more laser light generators/emitters,
   said laser light generators/emitters being arranged in a respective seat with emission hole coaxial therewith, formed on the side surface of said cylindrical body,
   each of said seats and said respective emission holes being arranged along a respective longitudinal axis inclined with respect to said rotation axis of said cylindrical body so that the laser rays emitted by said generators/emitters are inclined downwardly towards a roadway beneath the vehicle,
   said drive means being coupled to said revolving element to rotate said cylindrical body about said rotation axis at a sufficient rotational speed to form an image of a cone of light,
   said cone of light having a base directed towards a plane of travel of said vehicle and laying on the roadway, said cone having an axis substantially coincident with said vertical rotation axis and a vertex arranged on said rotation axis above said support element to envelope a body of said vehicle and move at a corresponding speed to a speed of the vehicle to result in the vehicle being clearly visible during conditions of poor visibility.

2. Optical signaling device according to claim 1, wherein said laser light generators/emitters are electrically connected to said power source by means of a rotating distributor.

3. Optical signaling device according to claim 1, wherein said drive means comprise at least one electric motor.

4. Optical signaling device according to claim 1, including laser ray generators/emitters directed upwardly.

5. Optical signaling device according to claim 1, wherein non-coherent light signaling means provided with a rotating dish are housed in said revolving element.

* * * * *